UNITED STATES PATENT OFFICE.

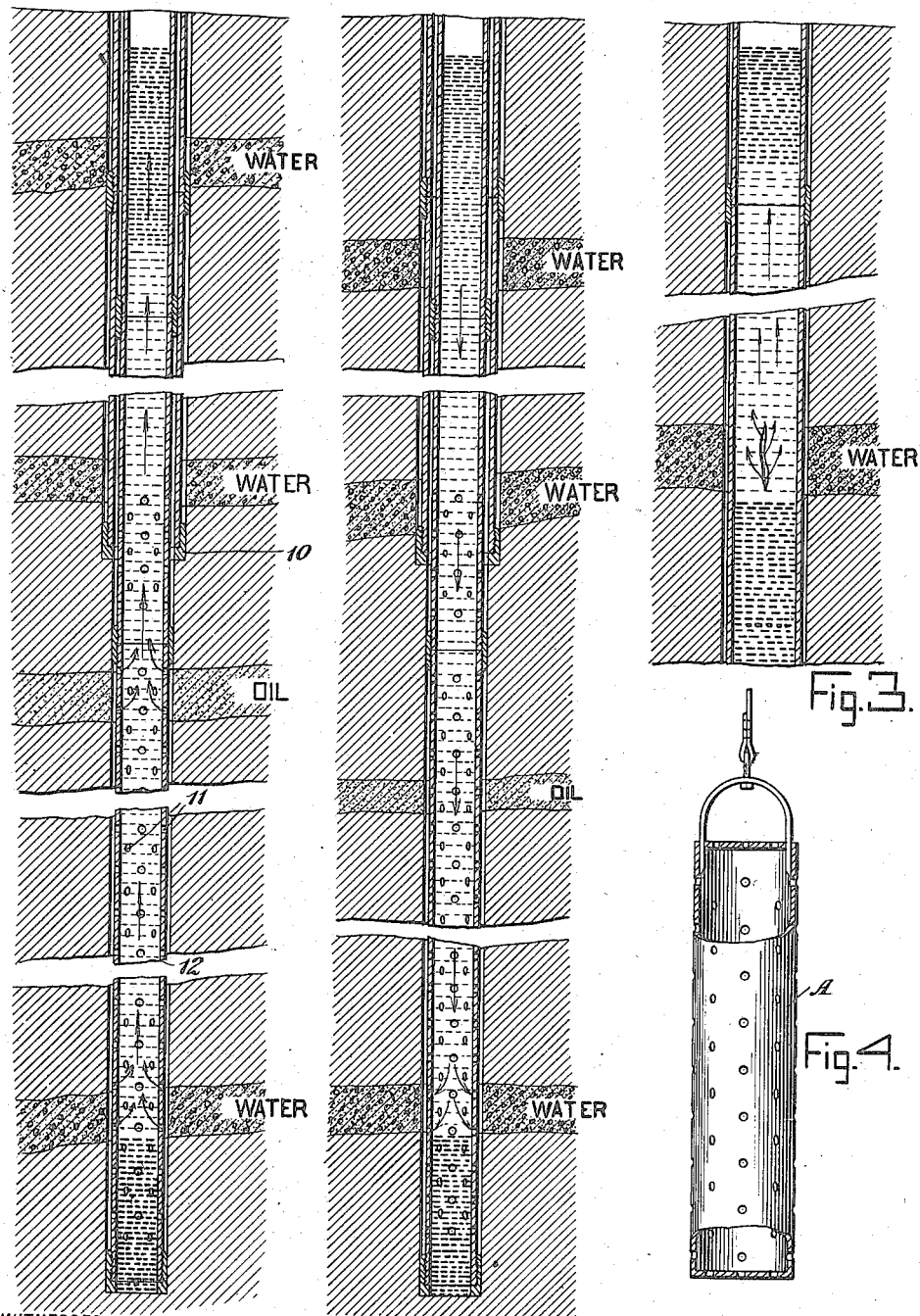

TITUS ANDREW BEECHER, OF DRUMRIGHT, OKLAHOMA.

METHOD FOR LOCATING LIQUID STRATA IN A WELL.

1,133,218.  Specification of Letters Patent.  Patented Mar. 23, 1915.

Application filed April 22, 1914. Serial No. 833,664.

*To all whom it may concern:*

Be it known that I, TITUS A. BEECHER, a citizen of the United States, and a resident of Drumright, in the county of Creek and State of Oklahoma, have invented a new and Improved Method for Locating Liquid Strata in a Well, of which the following is a full, clear, and exact description.

The method has for its purpose the location of a liquid entering a well, and has reference more particularly to the location of water entering an oil or gas well, to which wells water is very injurious, and, therefore, a water stratum must positively be shut off from the well to make an oil or gas well exploitable. In locating the water entering the well, I employ a method which gives an indication whereat the water enters the well. In doing this I make a certain improvement over my Patents Nos. 1,090,673 and 1,090,674. In the present method, a proper substance is used to indicate the location of water entering the well by placing the substance in a predetermined position in the well and then displacing the liquid from the well, then taking a sample of the liquid in the well to ascertain if it contains the substance. The substance used in this method may be such as to change the color of the liquid in the well, or its character, or both. If a coloring substance is used, it may be either a soluble or an insoluble substance. As, for example, as an insoluble coloring matter, chalk or mud could be used. A non-soluble coloring substance, when used, will be in a finely divided state, so as to obtain a perfect suspension of the substance in the liquid. The substance may be of a higher or lower specific gravity than water. When changing the character of the liquid in the well, such substances as sugar, salt, or similar substances, can be used, in which case the liquid may remain uncolored and detection of the dissolved substance may be obtained by a suitable analysis. The substance used for changing the character of the liquid in the well may also be of a specific gravity higher or lower than that of water.

The substances to be used for the detection of liquid strata will vary according to the character of the liquid present in the well. As in many instances a colored substance would not be suitable, a solution can be formed which is not affected by the mixture of liquids present in the well and which will dissolve only in water, if present. In all cases the substance used for detection, whether soluble or non-soluble and colored or non-colored, is distributed through the entire liquid mass present in the well. The liquid of the well so contaminated is substituted by water not contaminated with the substance used for detection by running the said non-contaminated water into the well by gravity or by pumping it into the well or by baling the contaminated liquid out of the well. Any of the above methods desired can be used. This displacement of the contaminated water will clear the liquid of the well above where the water enters the well from the substance used for detection; while the liquid below the water entrance into the well will remain contaminated therewith. By sending down a suitable tool for getting samples from different depths, it can be easily found where the contaminated liquid in the well begins, thus, determining the location of the entrance of the water into the well. When a test is made with substances that have a tendency to rise from below where the water enters the well, the same is held down or driven back, so to say, by pumping or running water continuously into the well, so as to force the same into the water stratum from where the water enters the well. Thus, a rise of the substance is prevented and the samples are obtained while the water is continuously forced from the top of the well into the water stratum, so as to prevent the rise of the substance under the stratum, and thus obtain the exact location of the water entering the well.

The above described method is illustrated diagramatically in the accompanying drawings forming a part of the specification, in which similar characters of reference indicate corresponding parts in all the views and wherein—

Figure 1 is a section through a drilled well, showing different strata, and illustrating my method of locating a water stratum; Fig. 2 is a similar section through a well illustrating a modified method of location; Fig. 3 shows a leaking casing of a well; and Fig. 4 is a partial sectional view of a container used for placing a detecting substance in a well.

Referring to Fig. 1, the well is shown as intersecting layers supplying water and oil. 10 is a casing shoe from around which water may enter into the well. Water may also enter the well through the perforation 11 of the casing 12, passing below the shoe 10, the perforations 11 being intended for the entrance of the oil or gas into the well. To determine where the water enters the well, a proper detecting substance is placed in the container A, shown in Fig. 4, and also into the well where the substance is dissolved or diffused in the liquid of the well, preferably between the bottom of the well and slightly above the shoe 10. The substance may be such as to color the liquid in the well, or it may be such that it will dissolve therein, forming a proper solution. But the substance used in the method shown in Fig. 1 will not have a tendency to rise with the water entering the well from the water stratum. In this method the water from the well is baled from the natural level of the water in the well, thus causing an inflow of water and oil into the well due to the displacement of the liquid level in the well. Therefore, all of the detecting substance which lies above the water stratum will be carried away by the displacement of the liquid in the well, leaving that part of the liquid which is below the water stratum in Fig. 1 undisturbed, so to say; and by sending a baler to get samples, the place where the water enters the well can be detected, and, according to the substance used for detection, the samples obtained can be analyzed for color, if a coloring substance is used, or by any other characteristic reaction, to determine if the detecting substance used is present in the sample obtained by baling.

In the method shown in Fig. 2, the substance used is such that it will rise with the water entering the well, if the same is baled for samples, or from its natural level, and, therefore, in this method water non-contaminated with detecting matter is forced into the well so as to cause the same to flow out into the water stratum indicated by the arrow in said figure. Therefore, the detecting matter below the stratum will remain substantially undisturbed; and samples taken, while the water is continuously forced, from below the point of the water stratum in the well will be contaminated with the detecting substance used. The same method can be used to ascertain whether the samples contain the detecting matter or not, as previously stated.

In Fig. 3 the method used for detecting is substantially similar to the method used in Fig. 1, but in such cases, where there is a leakage in the casing, it is preferable to use a detecting substance which has a specific gravity higher than that of water and which is not easily diffusible by the liquid of the well.

Having thus described my invention, I claim as new and desire to secure by Letters Patent:

1. The method of ascertaining the location at which water flows into a well, consisting in distributing a suitable non-colorable substance in the well within the space where the flow of water may be expected, then forcing water into the well, which water is not contaminated with said substance, then getting samples of water from different known depths of the space in the well where said substance was distributed while the non-contaminated water is continuously forced into the well, then ascertaining if the extracted samples contain said non-colorable substance.

2. The method of ascertaining the location at which water flows into a well, consisting in distributing a known substance in the well within the space where the flow of water may be expected, then preventing the rising of said substance above the place at which the water flows into the well by forcing water into the well, which water is not contaminated with said substance, then getting samples of water from different known depths of the space in the well where the said substance was distributed while the non-contaminated water is forced into the well, and then ascertaining if the extracted samples contain said substance.

In testimony whereof I have signed my name to this specification in the presence of two subscribing witnesses.

TITUS ANDREW BEECHER.

Witnesses:
A. F. DIEHL,
W. E. NICODEMUS.